(12) United States Patent
Astrauskas

(10) Patent No.: US 9,109,319 B2
(45) Date of Patent: Aug. 18, 2015

(54) SYSTEM AND METHOD TO DETECT CHILD PRESENCE USING ACTIVE MEMS SENSORS

(75) Inventor: Jurgis Astrauskas, St Charles, IL (US)

(73) Assignee: STMicroelectronics, Inc., Coppell, TX (US)

( * ) Notice: Subject to any disclaimer, the term of this patent is extended or adjusted under 35 U.S.C. 154(b) by 699 days.

(21) Appl. No.: 13/453,830

(22) Filed: Apr. 23, 2012

(65) Prior Publication Data

US 2012/0235514 A1    Sep. 20, 2012

(51) Int. Cl.
*H02H 11/00* (2006.01)
*D06F 33/02* (2006.01)

(52) U.S. Cl.
CPC ............... *D06F 33/02* (2013.01); *H02H 11/00* (2013.01)

(58) Field of Classification Search
CPC ....................................................... H02H 11/00
USPC ........................................................... 307/326
See application file for complete search history.

(56) References Cited

U.S. PATENT DOCUMENTS

| 3,527,904 | A | 9/1970 | Worst |
| 6,654,975 | B2 | 12/2003 | Broker |
| 7,081,657 | B2 * | 7/2006 | Faris .............................. 257/415 |
| 2010/0077810 | A1 | 4/2010 | De Franceschi |

* cited by examiner

*Primary Examiner* — Hal Kaplan
(74) *Attorney, Agent, or Firm* — Gardere Wynne Sewell LLP

(57) ABSTRACT

The presence of a child within an enclosed space in an appliance, such as a washing machine, dishwasher or refrigerator, is detected using one or more MEMS sensors positioned to detect movement within the enclosed space through various measured characteristics. In preference, combinations of different types of MEMS sensors are utilized to detect the movement. Movement may be attributed to the presence of a child inside the enclosed space, rather than resulting from other influences, with increased reliability if the determination is made based upon such combinations of different characteristics. Safety processes may be initiated upon detecting the presence of the child.

22 Claims, 3 Drawing Sheets

SYSTEM AND METHOD TO DETECT CHILD PRESENCE USING ACTIVE MEMS SENSORS

CROSS-REFERENCE TO RELATED APPLICATION

This application claims priority as a continuation-in-part of U.S. patent application Ser. No. 12/916,206 filed Oct. 29, 2010 and entitled "SYSTEM AND METHOD TO DETECT CHILD PRESENCE." The content of the above-identified patent document(s) is hereby incorporated by reference.

TECHNICAL FIELD

Generally, the present disclosure relates to detecting the presence of a child in enclosed areas such as the wash drum of a washing machine or the interior of a refrigerator.

BACKGROUND

Many homes, offices, and buildings contain machines, such as refrigerators and washing machines, which have confined areas with doors that are secured or even sealed by automatic latching (mechanical, magnetic, etc.). Children, particularly small children, are known to explore and climb into such confined areas, which may result in serious injury or death if the child becomes trapped inside for an extended period of time or if the machine is activated while the child in within the machine.

Accordingly, there is a need in the art to detect the presence of a child within a confined area of a machine and to prevent activation of the machine while a child is inside.

SUMMARY

The presence of a child within an enclosed space in a machine, such as a washing machine, dishwasher or refrigerator, is detected using one or more MEMS sensors positioned to detect movement within the enclosed space through various measured characteristics. In preference, combinations of different types of MEMS sensors are utilized to detect the movement. For instance, movement may be attributed to the presence of a child inside the enclosed space rather than other factors with increased reliability if the determination is made based upon whether shifts in the center of gravity for a load supported inside the machine coincide with noise emanating from the interior of the enclosed space.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

FIGS. 1 through 6, discussed below, and the various embodiments used to describe the principles disclosed in this patent document, are by way of illustration only and should not be construed in any way to limit the scope of the disclosure.

Detection of a child in a confined area using a child detection system (CDS) may detect the presence of a child through motion translated into an electrical signal by at least one motor or one or more sensors. By detecting the electrical signal, a user may be alerted to the presence of a child in a machine.

Figure 1:
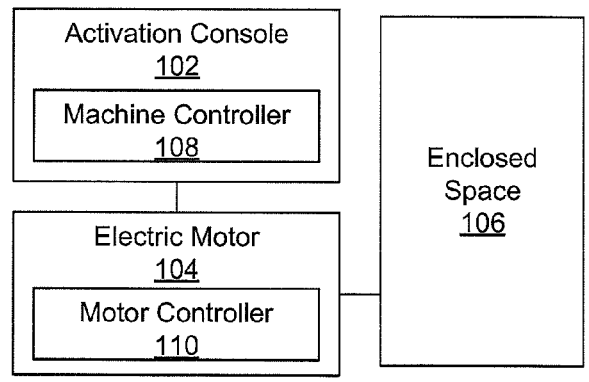
FIG. 1 is a block diagram of one system implementing child detection within an enclosed space of a machine according to one embodiment of the present disclosure.

FIG. 1 is a block diagram of one system of implementing a child detection system (CDS) detecting the presence of a child in an enclosed spaced within a machine according to one embodiment of the present disclosure. System 100 includes an activation console 102 that electrically communicates via control signals with an engine or electric motor 104, which in turn is coupled to a device associated with or within an enclosed space 106 within the machine. During operation of the system 100, the activation console 102 is normally used to selectively activate the electric motor 104 to drive some mechanical device within the machine. Thus, the electric motor 104 may be coupled to the enclosed space 106 by a belt passing through or around a portion of the enclosed space 106, by projection of a portion of the drive shaft of the electric motor 104 into the enclosed space, or by some other mechanical drive linkage. In one illustrative embodiment, machine 100 is a washing machine with a wash cylinder forming the enclosed space 106, where the wash cylinder or drum is rotated by the electric motor 104. In another illustrative embodiment, machine 100 is a dishwasher with a rotating sprayer within the enclosed space 106 that is rotated by the electric motor 104. It is desirable to avoid activating the electric motor 104 when a child (or, equivalently, a small animal) is located within the enclosed space 106 of the machine 100. Detection of the child within the enclosed space 106 of a machine 100 prior to activation of the electric motor 104 may prevent significant harm from occurring to the child.

In the exemplary embodiment of a washing machine, movement of the child within the enclosed space 106 formed by the wash cylinder is mechanically transferred to and causes motion within the electric motor 104. Since electric motors also function as electric generators, mechanical movement of the wash cylinder in response to the child shifting therein is thus transformed into at least one electrical signal that may be detected at the activation console 102. Similarly, in the exemplary embodiment of a dishwasher, movement by the child within the enclosed space 106 may cause movement of the rotating sprayer, which movement is transferred to and causes motion within the electric motor 104. By detecting the presence of the child based on motion within the enclosed space 106, a user of the machine 100 may be alerted to the presence of the child, for example, by sounding an acoustic alarm device (not shown) within the activation console 102 and/or flashing or otherwise activating one or more lights (also not shown) forming part of the activation console or otherwise visible from the exterior of the system 100.

In the example shown in FIG. 1, activation console 102 is intended to refer to any device that may be used to engage electric motor 104 into an operational state, to impart kinetic (mechanical) energy to a device associated with or within the enclosed space 106. Activation console 102 may comprise one or more input devices and one or more screens that display the operational status, information, or other items related to the machine 100.

Electric motor 104 in the example of FIG. 1 is intended to refer to any device capable of generating kinetic energy and transferring that energy to the machine associated with or within the enclosed space 106, and that is conversely capable of detecting the transfer of kinetic energy to that machine from within enclosed space 106. Examples of the electric motor 104 include, but are not limited to, an electromagnetic motor configured to transform an electric current into rotational kinetic energy. In one embodiment, during a period in which electric motor 104 is not in an active state as determined by the control signals from activation console 102, kinetic energy or movement within the enclosed space 106 is mechanically transferred into the electric motor 104, as by movement of a belt or other drive linkage between the electric motor 104 to the machine associated with or within enclosed space 106 (e.g., rotation or other shifting of the wash cylinder) or by direct rotation of the drive shaft of the electric motor 104 (e.g., by movement of the rotating sprayer).

The machine associated with or within the enclosed space 106 may be any device, apparatus, or unit that accepts mechanical drive force from the electric motor 104. Examples of such mechanical drive force input include kinetic energy in the form of motion from an apparatus such as the wash cylinder and a connecting belt in a washing machine or a rotating sprayer in a dishwasher.

Those skilled in the art will recognize that the complete structure of a machine including an enclosed space posing a danger to children is not depicted in the drawings, and that the full details of operation of such a machine are not described. Instead, for simplicity and clarity, only so much of such a machine as is either unique to the present disclosure or necessary for an understanding of the present disclosure is depicted and described.

Figure 2:
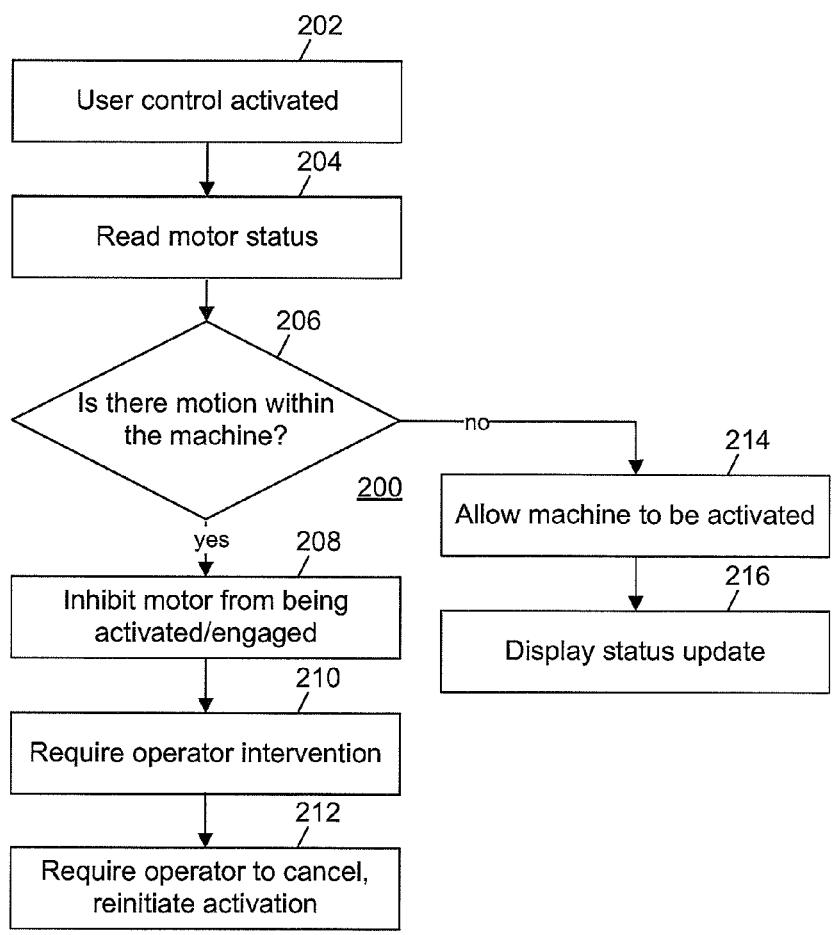
FIG. 2 is a high level flowchart of a safety process for detecting presence of a child within an enclosed space of a machine according to one embodiment of the present disclosure.

FIG. 2 is a high level flowchart of a safety process based upon detecting presence of a child within an enclosed space of a machine according to one embodiment of the present disclosure. The process 200 is preferably implemented within the machine controller 108 or similar control system of the machine 100 including an enclosed space 106, such as within the controller 108 mounted within the activation console 102 for system 100 and coupled to electric motor 104, generating control signals for starting and stopping operation of electric motor 104. In the exemplary embodiment illustrated FIG. 2, user activation of a user control to initiate operation of the machine is detected (step 202) and a check is made to determine whether motion has been detected inside the machine (step 204) since the machine was last operational. For example, the monitoring system electrically coupled to the electric motor 104 may set a flag if, at any time between the machine ending a last operational cycle and user activation of the control to start another operational cycle of the machine, movement within the enclose space 106 of the machine is detected based on current received from the electric motor 104. Current or another electrical signal output from the electric motor 104 may reflect that motion occurred in the enclosed space.

If monitoring for motion within the enclosed space of the machine (step 206) was detected at any time during the monitoring period (which may be all or any part of the time since the machine was last operational), the electric motor 104 is inhibited from being activated. If the motor 104 is inhibited from being activated or the system 100 is otherwise inhibited from being activated or engaged (step 208), operator intervention may be required (step 210) to "unlock" the machine 100 and resume operational status. The operator may be required to perform a predefined routine to restart the machine 100 (step 212), such as checking the interior of the enclosed space 206 as determined by opening and closing a door on the machine (detected using a door sensor, not shown) or manually canceling the activation of the machine 100 and re-initiating operation, to override the safety block resulting from detection of motion within the machine. If no motion was detected in the enclosed space 106 of the machine 100 during the monitoring period, the machine 100 is allowed to be activated or engaged (step 214) and a corresponding update is displayed on the activation console 102 (step 216).

Figure 3:
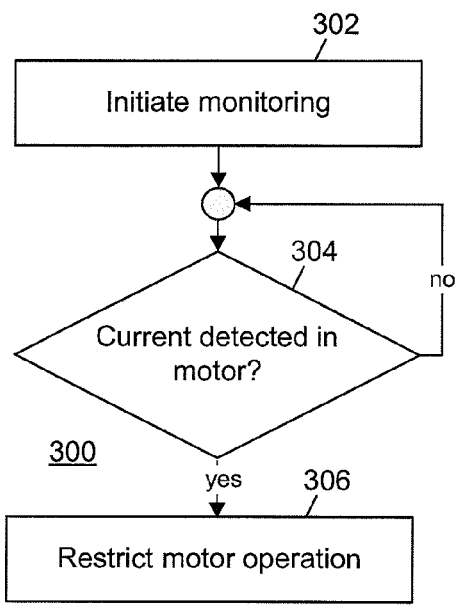
FIG. 3 is a high level flowchart of an alternate safety process based upon detecting presence of a child within an enclosed space of a machine according to another embodiment of the present disclosure.

FIG. 3 is a high level flowchart of an alternate safety process based upon detecting presence of a child within an enclosed space of a machine according to another embodiment of the present disclosure. Where process 200 is implemented within a machine controller 108 for the system 100, process 300 may be performed by a controller 110 or control system within or associated with the electric motor 104 (that is, a control system responding to switching signals to connect and disconnect various circuits within the electric motor 104). Thus, process 300 may be used separately from or in addition to process 200 within a particular system 100.

In process 300, monitoring of the motor for current caused (for example) by electromotive force produced by mechanical rotation of the motor's drive shaft is initiated (step 302). Such monitoring may be initiated, for instance, upon completion of a prior operating cycle for the machine 100 —that is, the machine controller (not shown) may signal the motor control system to initiate monitoring upon completion of the prior operational cycle for the machine.

As long as no current within the electric motor 104 is detected, indicating movement of the motor by an external force, the monitoring process continues. If current is detected within the motor 104 (step 304), that subsequent motor operation is restricted (step 306). For example, operation of the motor may be prevented or inhibited until a clearing signal is received by the motor controller 110 (for example, from the machine controller 108).

Figure 4:
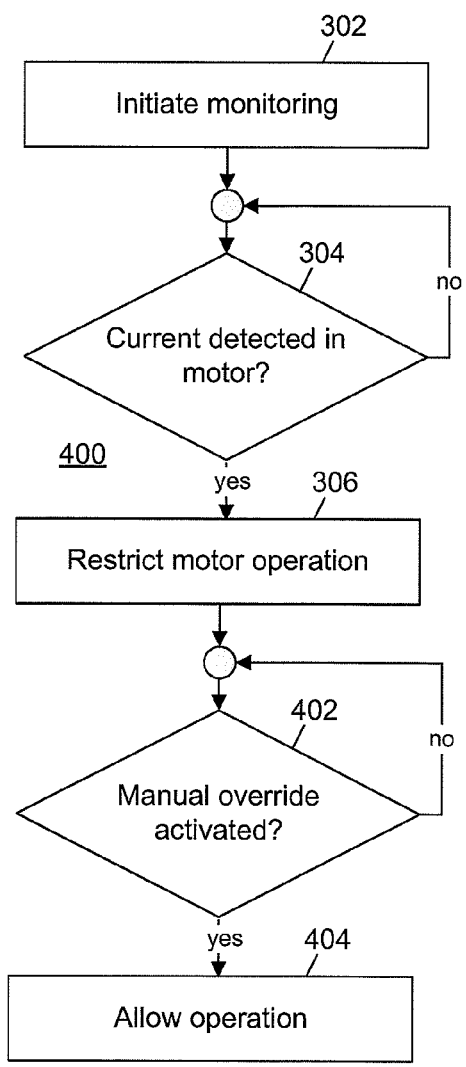
FIG. 4 is a high level flowchart of an alternate safety process based upon detecting presence of a child within an enclosed space of a machine according to yet another embodiment of the present disclosure.

FIG. 4 is a high level flowchart of an alternate safety process based upon detecting presence of a child within an enclosed space of a machine according to yet another embodiment of the present disclosure. The process 400 is substantially similar to the process 300 illustrated in FIG. 3, with the addition of allowing manual override of a motor lock after the restriction of motor operation. Manual override may be provided, for example, by a user accessible switch (not shown) within the activation console that is directly connected to the motor 104. If a manual override is provided, upon restriction of the motor operation (step 306) the process begins polling for activation of the manual override (step 402). A particular set of actions may be required for the manual override, such as activation of a preset combination of user input buttons or keys at the activation console 102, including activation concurrently or in a predetermined sequence. The manual override allows operation (step 404). Alternatively, or in addition thereto, a door to the enclosed space 106 may need to be opened and closed prior to the motor being re-enabled.

Figure 5:
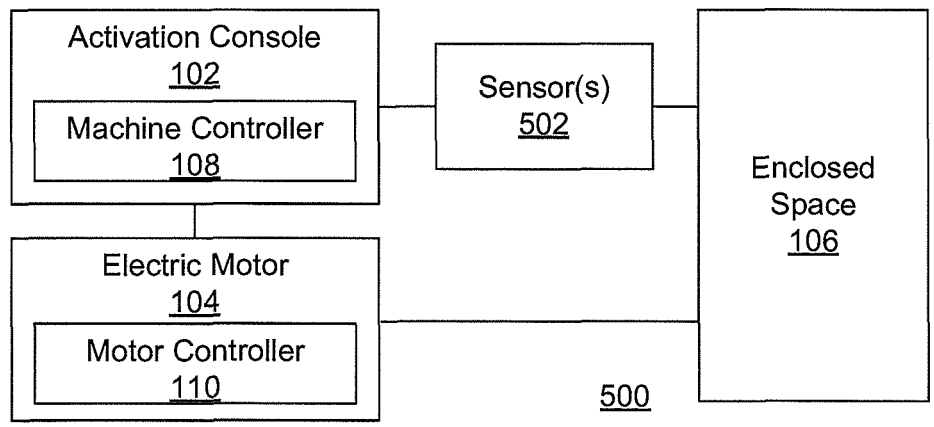
FIG. 5 is a block diagram of a second system implementing child detection within an enclosed space of a machine according to an embodiment of the present disclosure.

FIG. 5 is a block diagram of a second system implementing child detection within an enclosed space of a machine according to an embodiment of the present disclosure. The system 500 is substantially similar to the system 100 of FIG. 1, but with the further inclusion of one or more sensor(s) 502 connected to the activation console 102 and monitoring a portion of the enclosed space 106 (or a device associated with or within that space). Sensor(s) 502 may be either passive or active (or a combination of active and passive sensors), and may be any device capable of generating an electrical current or other signal based upon the detection of force or energy (including without limitation vibration, temperature, and air pressure). For example, the sensor 502 could be a passive pressure sensor located inside a refrigerator, washing machine, dishwasher, etc., and may be either a single large-area sensor or an array of coordinately operated sensors at various locations on interior surfaces of the enclosed space 106. In either case, the pressure sensor(s) are used to detect changes in pressure at various locations that would be caused by movement of a child inside the enclosure, and to pass an electrical signal to the activation console 102. Alternatively, the sensor(s) 502 may include in any combination of temperature sensor(s), accelerometer(s), one or more gyroscopes, infrared light emitter(s) and/or detector(s), or acoustic sensor(s) (i.e., microphone), or any of the sensors discussed herein. The sensor(s) 502 are configured and controlled to detect movement within the enclosed space 106 and/or the presence of an object with temperature in the range of human temperatures within the enclosed space 106. Those skilled in the art will understand that the particular sensors utilized will depend on the nature of the machine 100, since (for example) temperature sensors may be appropriate for refrigerators but not dishwashers. The activation console 102 may receive the signal and inhibit activation, or allow activation, as appropriate.

Figure 6:
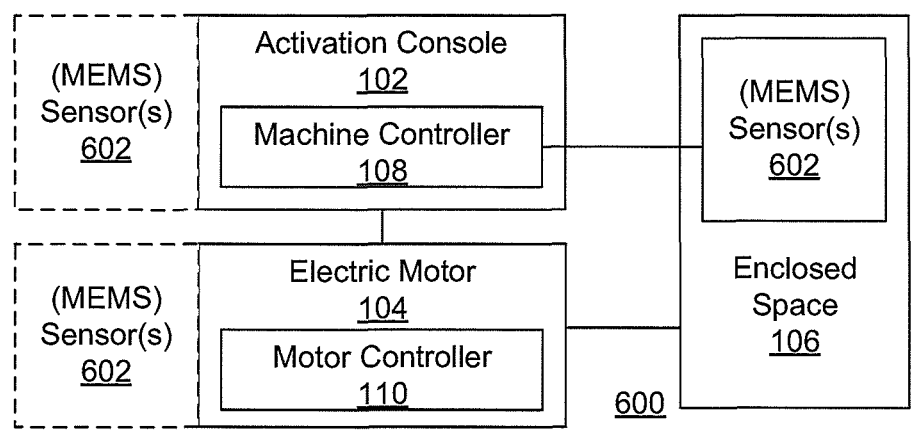
FIG. 6 is a block diagram of a third system implementing child detection within an enclosed space of a machine according to an embodiment of the present disclosure.

FIG. 6 is a block diagram of a third system implementing child detection within an enclosed space of a machine according to an embodiment of the present disclosure. System 600 is similar to systems 100 and 500, but includes sensor(s) 602. As shown, sensor(s) 602 may be mounted on or within the activation console 102 and/or the electric motor 110. Preferably, however, at least some sensor(s) 602 are mounted within or in association with the enclosed space 106 (e.g., on walls for the enclosure).

Sensor(s) 602 are preferably one or more micro electro-mechanical system (MEMS) switches, configured to sense one or more of pressure (either due to direct physical forces or of air pressure), vibration or shock (acceleration), acoustic events, and temperature. MEMS sensors 602 are configured to monitor conditions inside the enclosed space of the machine 600 and to each generate an electrical signal to the machine controller 108 within the activation console 102. The machine controller 108 employs MEMS sensors 602 to detect machine conditions that indicate the presence of a child within the enclosed space 106.

The particular type and arrangement of MEMS sensors 602 within machine 600, and the programming of machine controller 108 based upon signals from the MEMS sensors 602, will necessarily depend upon the nature and function of the machine 600. For example, pressure-sensitive MEMS sensors 602 positioned within vertical supports for the cabinet of a refrigerator would allow the machine controller 602 to monitor for movement within the interior of the enclosure by changes in the distribution of pressures (resulting from movement of a child's weight within the enclosed space), with the machine controller 108 determining whether shifts in pressure indicate presence of a child within the enclosed space by the regularity/variability of the pressure changes or the direction of movement indicated by such changes. A two-dimensional array of temperature-sensitive MEMS sensors 602 could monitor the interior of the refrigerator for movement of relatively "warm" spots while the refrigerator door is closed, with the machine controller 108 determining whether shifts in the location of warm spots indicate presence of a child within the interior of the refrigerator based upon the speed of movement and other factors. One or more vibration-sensitive MEMS sensors 602 could monitor for vibrations consistent with impact due to movement of a child within the refrigerator enclosure, with the machine controller 108 allowing for levels of background vibration while a compressor for the refrigeration system is running. Acoustic-sensitive MEMS sensors 602 may monitor for noise, with the machine controller 108 identifying the source of the noise and ascertaining regularity or irregularity to determine whether the noise indicates the presence of a child inside the refrigerator.

In each of the above cases, changes detected by MEMS sensor 602 may be qualified and/or disregarded, or filtered, based on whether the door to the enclosed space 106 is open or closed at the time the changes are detected. Thus, for example, a change in the center of gravity for the load supported by a refrigerator's internal frame need not be considered indicative of the presence of a child inside the refrigerator while the door is open (which might be due to items being placed inside), unless such changes continue after the door is closed. Further, the reliability of a determination may be considered increased when combinations of more than one indicator is detected, such as when detected changes in the center of gravity for the load supported inside a refrigerator while the door is closed coincide with detection of noise emanating from the interior of the refrigerator.

It should be noted that steps 204 and 206 in FIG. 2 may be performed by reading signals from the MEMS sensors 602, and determining whether motion within the machine is detected based on such signals. In such a case, motion inside the enclosed space may be determined directly from movement of warm spots or the emanation of noise from the interior, or indirectly from pressure (center of gravity) shifts or vibrations.

It should also be noted that a variety of actions may be initiated by or within the machine in addition to or in lieu of steps 208, 210 and 212 in FIG. 2. For example, merely inhibiting operation of a motor may be insufficient to protect a child trapped within the enclosed space of the machine. As noted above, audible and visual warning indicators may be activated until disabled by the user. In addition, a latching mechanism for securing closure of the door to the enclosed space may be electronically opened. In the case of a refrigerator, an electromagnet repelling the magnetic seal of the door may be activated to cause the door to open.

It should be understood that although an exemplary implementation of one or more embodiments of the present disclosure are illustrated in the drawings and described above, the principles of the present disclosure may be readily implemented or adapted using any number of currently known techniques. The present disclosure should in no way be limited to the exemplary implementations, drawings, and techniques illustrated and described herein, including the exemplary design and implementation illustrated and described herein, but may be modified within the scope of the appended claims along with their full scope of equivalents.

What is claimed is:

1. A method, comprising:
   monitoring an output of one or more micro electromechanical system (MEMS) sensors each positioned to detect a condition inside an enclosed space within an appliance; and
   in response to receiving outputs from the one or more MEMS sensors indicating movement of an object or a person inside the enclosed space, wherein the movement is not attributable to the operation of the appliance, initiating a safety process within the appliance.

2. The method of claim 1, wherein one or more MEMS sensors comprise a plurality of MEMS sensors each configured to detect a different condition inside the enclosed space.

3. The method of claim 2, wherein the safety process is initiated in response to receiving one of a predetermined combination of outputs from the MEMS sensors, each of the outputs separately corresponding to movement inside the enclosed space that is not attributable to operation of the appliance.

4. The method of claim 2, wherein a first one of the MEMS sensors is configured to detect one of pressure, temperature, vibration and noise and a second one of the MEMS sensors is configured to detect a different one of pressure, temperature, vibration and noise.

5. The method of claim 2, wherein the plurality of MEMS sensors comprises one or more MEMS sensors configured to detect distribution of pressure from a load inside the enclosed space and a MEMS sensor configured to detect noise emanating from the enclosed space.

6. The method of claim 5, wherein the safety process is initiated in response to detecting changes to the distribution of pressure from the load coinciding with noise emanating from the enclosed space.

7. The method of claim 1, wherein the safety process comprises inhibiting operation of a motor.

8. The method of claim 1, wherein the safety process comprises one or more of sounding an audible warning and actuating a visible warning indicator.

9. The method of claim 1, wherein the safety process comprises unlatching or opening a door to the enclosed space.

10. The method of claim 1, wherein the appliance comprises one of a washing machine, a dryer, an oven, a refrigerator, and a dishwasher.

11. An object or person detection system, comprising:
    one or more micro electromechanical system (MEMS) sensors each positioned to detect a condition inside an enclosed space within an appliance; and
    a controller configured to monitor an output of the one or more MEMS sensors and, in response to receiving outputs from the one or more MEMS sensors indicating movement of an object or a person inside the enclosed space, wherein the motion is not attributable to operation of the appliance, to initiate a safety process within the appliance.

12. The object or person detection system of claim 11, wherein one or more MEMS sensors comprise a plurality of MEMS sensors each configured to detect a different condition inside the enclosed space.

13. The object or person detection system of claim 12, wherein the controller is configured to initiate the safety process in response to receiving one of a predetermined combination of outputs from the MEMS sensors, each of the outputs separately corresponding to movement inside the enclosed space that is not attributable to operation of the appliance.

14. The object or person detection system of claim 12, wherein a first of the MEMS sensors is configured to detect one of pressure, temperature, vibration and noise and a second of the MEMS sensors is configured to detect a different one of pressure, temperature, vibration and noise.

15. The object or person detection system of claim 12, wherein the plurality of MEMS sensors comprises one or more MEMS sensors configured to detect distribution of pressure from a load inside the enclosed space and a MEMS sensor configured to detect noise emanating from the enclosed space.

16. The object or person detection system of claim 15, wherein the controller is configured to initiate the safety process in response to detecting changes to the distribution of pressure from the load coinciding with noise emanating from the enclosed space.

17. The object or person detection system of claim 11, wherein the safety process comprises inhibiting operation of a motor.

18. The object or person detection system of claim 11, wherein the safety process comprises one or more of sounding an audible warning and actuating a visible warning indicator.

19. The object or person detection system of claim 11, wherein the safety process comprises unlatching or opening a door to the enclosed space.

20. A method, comprising:
    monitoring an output of one or more micro electromechanical system (MEMS) sensors each positioned to detect a condition inside an enclosed space within an appliance; and
    in response to receiving outputs from the one or more MEMS sensors indicating presence of an object or a person not accounted with operation of said appliance inside the enclosed space, initiating a safety process within the appliance.

21. The method of claim 20, wherein the one or more MEMS sensors include a first sensor configured to detect one of pressure, temperature, vibration and noise and a second sensor configured to detect a different one of pressure, temperature, vibration and noise; wherein outputs from one or both of the first and the second sensor indicate the presence of said object or said person.

22. The method of claim 21, wherein the safety process is initiated in response to detecting the presence of an object with temperature in range of human temperatures within the enclosed space.

* * * * *

UNITED STATES PATENT AND TRADEMARK OFFICE
CERTIFICATE OF CORRECTION

| | | |
|---|---|---|
| PATENT NO. | : 9,109,319 B2 | Page 1 of 1 |
| APPLICATION NO. | : 13/453830 | |
| DATED | : August 18, 2015 | |
| INVENTOR(S) | : Jurgis Astrauskas | |

It is certified that error appears in the above-identified patent and that said Letters Patent is hereby corrected as shown below:

ON THE TITLE PAGE

The Related U.S. Application Data paragraph is missing. Please add the following item (63) to the title page:

Related U.S. Application Data

(63)    Continuation-in-part of application No. 12/916,206, filed on Oct. 29, 2010.

Signed and Sealed this
Twelfth Day of January, 2016

Michelle K. Lee
*Director of the United States Patent and Trademark Office*